United States Patent Office.

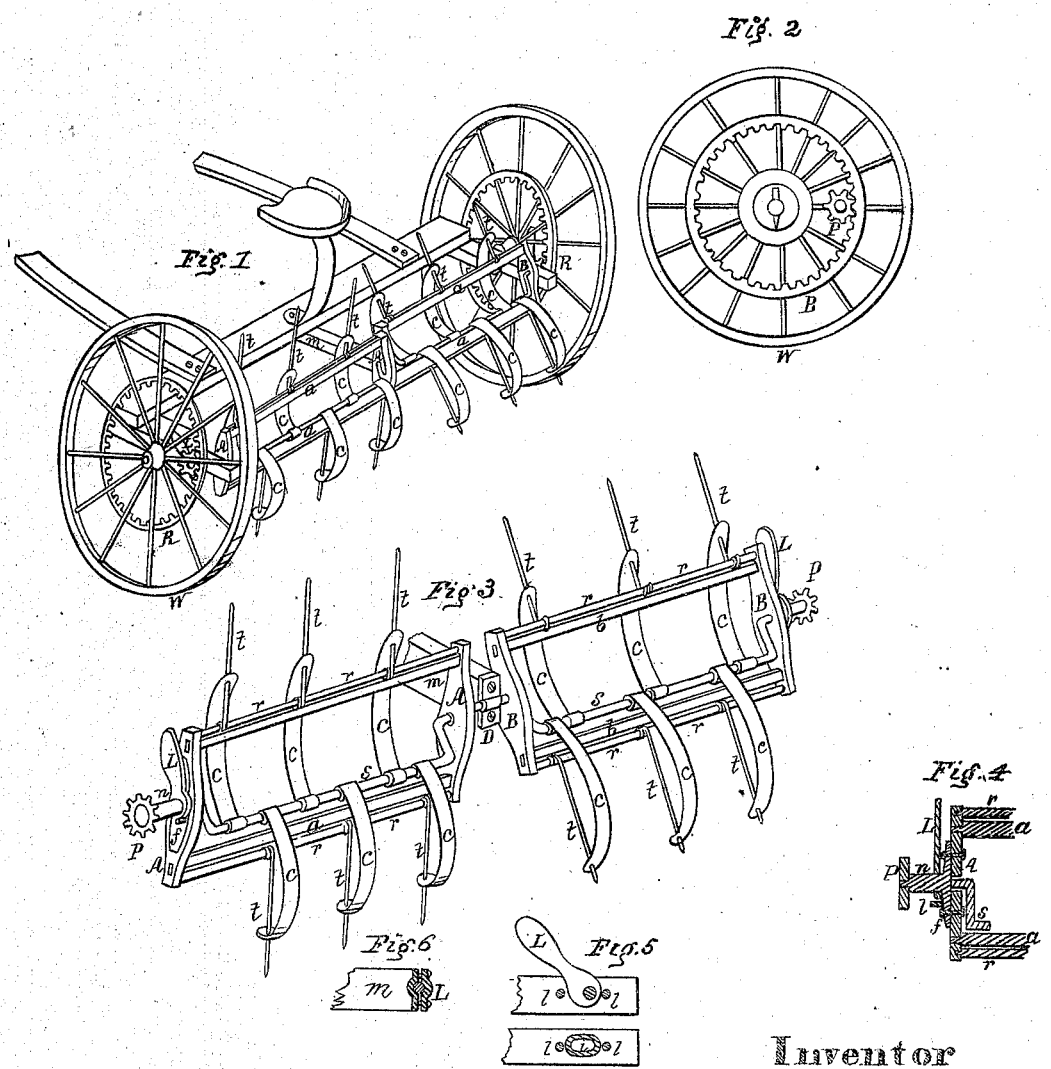

J. B. KELLEY, OF BRANDON, VERMONT.

Letters Patent No. 95,234, dated September 28, 1869.

---

IMPROVEMENT IN HAY-TEDDERS.

---

The Schedule referred to in these Letters Patent and making part of the same.

---

*To all whom it may concern:*

Be it known that I, J. B. KELLEY, of Brandon, in the county of Rutland, in the State of Vermont, have invented certain new and useful Improvements in Hay-Tedders; and I do hereby declare that the following is a full, clear, and exact description of the construction and operation of the same, reference being had to the accompanying drawings, in which—

Figure 1 is a perspective view of the whole;

Figure 2, a side view of one of the wheels, with the gearing attached;

Figure 3, an enlarged view of the main portion of the machine;

Figure 4, a section of one end of the same;

Figure 5, a detached view of the eccentric lever, which throws the machine out of gear; and Figure 6, a side view of the clamp-box.

In the construction of my machine I use two revolving heads or frames, composed of the cross-pieces A A and B B, and side-pieces $a\ a$ and $b\ b$, and having the rods $r\ r$ inserted outside the side pieces $a$ and $b$, for the purpose of attaching the teeth or forks $t\ t$, which may be of any desired number.

These heads or frames, composed of wood, or other suitable material, are made to revolve around the eccentric shaft $s\ s$, made of iron, or other suitable material, the shaft being held in position by the clamp-box D, which is attached to the frame of the carriage, and acts upon the centre of the shaft, and by which the shaft D is adjusted to any required position.

This adjustable shaft carries a series of curved arms, $c\ c\ c$, having one end attached to the shaft, and the other to the teeth $t\ t\ t$, which move freely up and down through the eyes made to receive them, which eyes act as clearers of the teeth when the hay is brought to the position where it is to be thrown off.

The frames or heads A $a$ or B $b$ are revolved by the pinion P, which works in the annular wheel R attached to the carriage-wheel W.

The pinion P is attached to the short wrought-iron shaft $n$, which is fastened to the cross-piece A or B by means of the cast-iron plate $f$, as shown in fig. 4.

While these frames revolve, the adjustable shaft $s\ s$ remains stationary, being held by the clamp-box D, so that when it is required to take up the hay, the teeth $t\ t\ t$ project more or less from the eyes in the outer ends of the arms $c\ c\ c$, as shown on the left in fig. 3.

As the frames revolve, the teeth are drawn through the arms till the teeth project but slightly or not at all, and the hay drops off, as shown in fig. 3.

By clamping the shaft $s\ s$ lower down, the hay is cleared off sooner. Hence, the machine may be adjusted to suit hay in various conditions, and may be adapted to different kinds of weather, as, for instance, in windy weather it will be desirable to throw the hay off the teeth lower down.

It will be observed that the outer ends of the shaft $s\ s$ are supported by being inserted in elongated boxes $i$, fig. 5, set in the frame-work of the carriage, but the shaft is held in position only by the clamp-box D in the middle thereof.

To throw the machine out of gear, so that the frames will not revolve with the carriage-wheels, I employ the cam-lever L at each end of the shaft, acting against the lugs $l\ l$, fig. 5, and moving the shaft back and forth in the box $i$.

The teeth, being attached to the rods $r\ r\ r$ by one end being coiled around them, are easily removed and new ones inserted in case of breakage.

Having thus described my improved hay-tedder,

What I claim as my invention, and desire to secure by Letters Patent, is—

The revolving frames or heads A $a$ and B $b$, geared to the carriage-wheels W W, and carrying the teeth $t\ t\ t$, in combination with the adjustable eccentric shaft $s\ s$, carrying the curved arms $c\ c\ c$, and held in position by the clamp-box D, the whole constructed and operating substantially as herein set forth.

J. B. KELLEY.

Witnesses:
B. F. SPRAGUE, Jr.,
GEO. R. BOTTUM.